3,006,948
SYNTHESIS OF CYANOACETYLENE
John Happel, Yonkers, Charles J. Marsel, New York, and Anthony A. Reidlinger, Richmond Hill, N.Y. (all % Dept. of Chemical Engineering, New York University, New York 53, N.Y.)
No Drawing. Filed Apr. 23, 1958, Ser. No. 730,243
2 Claims. (Cl. 260—465.9)

This invention is broadly concerned with an improved process for the manufacture of certain acetylenic compounds, and more particularly, is concerned with the commercial and practical production of cyanoacetylene. The method, in general, involves the preparation of propargyl aldoxime preferably from propargyl aldehyde and, in turn, the preparation of cyanoacetylene from the propargyl aldoxime, the reactions being carried out under specific and critical conditions.

In the past, it has been well-known to prepare the important and technically valuable chemical compounds, the cyanoacetylenes by a variety of complicated, expensive, and involved processes. These operations were not readily adaptable to commercial operations. This was true, for example, for cyanoacetylene. The most common method and best known method for its preparation is that of Moureu and Bonegrand, Compt. Rend. 151, 946 (1910) in which complete preparation is shown in the following steps:

(a) The esterification of propiolic acid.
(b) The aminolysis of the resulting methyl propiolate.
(c) The dehydration of the resulting propiolamide.

Claisen, Ber. 36, 3664 (1903) described the preparation of certain substituted cyanoacetylenes by dehydrating the corresponding aldoximes with acetic anhydride according to the following reactions:

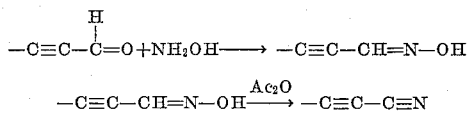

Although Claisen, as well as others, in earlier work attempted to extend this method as a general one to a synthesis for the preparation of cyanoacetylene, none were successful. The failures were caused by the fact that, despite repeated attempts, it was found to be impossible to prepare propargyl aldoxime. For example, the attempted preparation was carried out by contacting diethyl acetal of propargyl aldehyde with hydroxyl amine. The expected reaction of the acetal and hydroxyl amine to give the desired propargyl aldoxime may be formulated as follows:

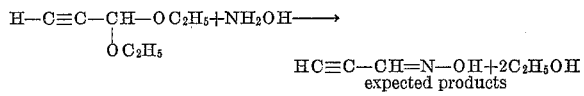

In each case, however, the product isolated was a compound of the same empirical formula as the oxime, but it was proved by chemical studies to be an isoxazole. The reaction may be formulated as follows:

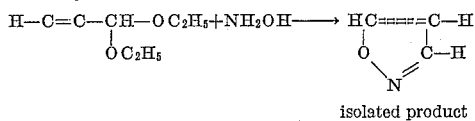

isolated product

In spite of these repeated failures, and the total lack of commercial procedures to make these compounds, it has now been discovered that cyanoacetylene and substituted cyanoacetylenes can be conveniently and most readily prepared by a relatively simple synthesis which is described briefly as a procedure in which propargyl alcohol is converted to propargyl aldehyde by selective oxidation as, for example, by manganese dioxide used in strong acid for example, sulfuric acid, by chromic oxide and sulfuric acid, or by any other known selective oxidizing agent for converting a hydroxyl grouping to an aldehydic carbonyl grouping without affecting the triple bond.

The acetylenic alcohol chosen for the starting material for conversion to the acetylenic aldehyde is dependent on the desired substituted cyanoacetylene which it is desired to prepare. Compounds of the type R—C≡C—CH$_2$OH may be employed as the starting material, in which the R may be an alkyl group such as methyl, ethyl, propyl, butyl, amyl, octyl, decyl and up to 20 carbon atoms, an aryl group such as phenyl, napthyl, and the like, a cycloalkyl group such as cyclopentyl, cyclohexyl, and the like, and heterocyclic group, such as a radical derived from thiophene, furane, pyridine, and the like. In general, the combination of steps comprising the synthesis has especial applicability to the preparation of cyanoacetylene, in which the synthesis the starting material is propargyl alcohol.

After the acetylenic alcohol has been converted to the acetylenic aldehyde by any desired and known means as described above, the acetylenic aldehyde is reacted with hydroxyl amine to produce the acetylenic oxime. For example, propargyl aldehyde is reacted with hydroxyl amine to produce the corresponding acetylenic oxime. The yield of oxime is dependent upon the purity of the acetylenic aldehyde used and the reaction conditions, especially the temperature, at which the oxime formation is attempted. In general, and it is especially contemplated as a feature of this invention, that the acetylenic aldehyde be used directly by direct reaction with the hydroxyl amine without any intervening isolation and purification steps. The reaction for the preparation of the oxime is preferably, but not necessarily, carried out with approximately stoichiometric equivalent amounts of the reactants or with a slight stoichiometric excess of the hydroxylamine. The reaction is best done in a slightly basic, aqueous reaction medium. It is an important and critical feature that the reaction medium is not too alkaline. A pH of 5–9 is considered optimum. The temperature should be maintained as low as possible and at the same time be at a level compatible with complete reaction and reasonable reaction rate. The temperature range is considered to be from 0° to 50° C. The maximum temperature is about 80° C. After the reaction to form the acetylenic oxime is relatively complete, the product is isolated and recovered by any suitable and known method. Preferably it is recovered in an anhydrous state, or as near so as reasonably possible, since the next step is essentially a dehydration step carried out by chemical means. For example, in the case of propargyl aldoxime, a yield of from 90 to 99% is readily obtained by ether extraction, followed by evaporation of the solvent.

The acetylenic oxime is next treated with a suitable chemical dehydrating agent such as acetic anhydride, concentrated sulfuric acid, oleum, caustic, phosphorous pentoxide, phosphorous trichloride, toluene sulfonyl chloride, sulfonic acids, certain resins used as dehydrating agents, and the like. Such agents may be used in a suitable solvent, and this may be particularly necessary if the oxime is a solid. For instance, the combination of toluene sulfonyl chloride in pyridine is very effective. During the course of the dehydration reaction, suitable mechanical apparatus should be provided to remove the product as it is formed, if this is at all possible. In the case of cyanoacetylene, a crude product is collected via a reflux condenser and by means of a take-off apparatus attached to the reaction vessel. This crude product can be further purified, if desired, such as by redistillation. For other products prepared by this improved and novel process, suitable variations available in the art can be used for recovery.

The cyanoacetylenes have many important uses. They can be used with strong oxidizing agents to give high temperature flames, and can be used alone or in conjunction with other materials as jet and missile fuels. The cyano compounds can be used as fumigants. They can be used as chemical intermediates in the formation of various derivatives, including substituted cyanoacetylenes and substituted propiolic acids. They are useful as the dienophiles in carrying out Diels-Alder type reactions with the ultimate formation of cyclic compounds.

The advantages of this improved and novel combination process over those shown in the prior art are that the synthesis can be adapted to industrial operations since it utilizes a relatively cheap starting material and in the case of cyanoacetylene, one which is commercially available, i.e. propargyl alcohol. The steps in the synthesis are integrated, and are relatively simple and safe to operate even though they employ acetylenic compounds. The yield and overall conversion of starting materials are high, and can be carried out with predictability and success.

The invention will be more fully and completely described by reference to the following examples but it is to be understood that it is in no way to be limited thereto.

*Examples*

A solution of 76 parts (1.1 moles) of hydroxylamine hydrochloride in 250 parts of water is treated with 72 parts of potassium carbonate. This mixture is then cooled to 5° C. with an ice-water bath and 62 parts (0.9 mole) of the essentially anhydrous propargyl aldehyde is added slowly thereto. The mixture is then agitated for one hour with the temperature being maintained at 30° C. or below. The solution is then extracted with small portions of ether several times. The ether extracts are combined, dried and filtered, and the ether is removed by evaporation at slightly reduced pressures. There is thus obtained about 59 parts of a low-melting solid (about 95% theoretical yield).

Approximately 59 parts (1.2 moles) of propargyl aldoxime is added slowly to about 100–120 parts (1.2 moles) of refluxing acetic anhydride. The acetic anhydride is in a reactor vessel which is equipped with a reflux condenser which is fitted with a take-off head. The crude cyanoacetylene product is collected from the dehydrating vessel over the range between 25 and 125° C. Redistillation of the crude product through a short fractionating column gives about 20–25 parts of cyanoacetylene boiling at 41–43° C.

What is claimed is:

1. A process for the preparation of cyanoacetylene which comprises in combination the steps of reacting propargyl aldehyde with hydroxylamine in an aqueous reaction medium at at pH value of 5–9 at temperatures in the range of 0° to 50° C., subjecting the resulting propargyl aldoxime to dehydration in the presence of acetic anhydride, and recovering cyanoacetylene therefrom.

2. A process for the preparation of cyanoacetylene which comprises in combination the steps of oxidizing propargyl alcohol to propargyl aldehyde by an oxidizing agent for converting a hydroxyl grouping to an aldehyde grouping without affecting the triple bond, directly reacting said propargyl aldehyde with hydroxylamine in a reaction medium at a pH value of 5–9 at temperatures in the range of 0° to 50° C., subjecting the resulting propargyl aldoxime to dehydration in the presence of a chemical dehydrating agent, and recovering cyanoacetylene therefrom.

References Cited in the file of this patent

UNITED STATES PATENTS

| | | |
|---|---|---|
| 2,404,280 | Dutcher | July 16, 1946 |
| 2,417,024 | Heinrich et al. | Mar. 4, 1947 |
| 2,455,651 | Bortnick | Dec. 7, 1948 |

OTHER REFERENCES

Claisen: "Berichte Deutsche Chemische Gesellschaft," volume 36, 1903, page 3665.

Pasedach et al.: B30899 IV b/120 "Patentanmeldung" (Germany), Jan. 12, 1956, 2 pages.